United States Patent [19]

Nelson

[11] 3,883,611
[45] May 13, 1975

[54] COPOLYESTER(ETHYLENE TEREPHTHALATE/TETRAMETHYLENE DIBROMOTEREPHTHALATE) A NEW BLOCK POLYMER

[75] Inventor: James P. Nelson, Woodridge, Ill.

[73] Assignee: Standard Oil Company, Chicago, Ill.

[22] Filed: June 15, 1972

[21] Appl. No.: 263,198

[52] U.S. Cl............................ 260/860; 260/DIG. 24
[51] Int. Cl............................................. C08g 39/02
[58] Field of Search.. 260/860, 75 R, 75 H, DIG. 24

[56] References Cited
UNITED STATES PATENTS

| | | | |
|---|---|---|---|
| 3,037,964 | 6/1962 | Bruson | 260/75 |
| 3,265,762 | 8/1966 | Keith | 260/75 |
| 3,642,944 | 2/1972 | Abbott, Jr. | 260/864 |

*Primary Examiner*—Morris Liebman
*Assistant Examiner*—T. Pertilla
*Attorney, Agent, or Firm*—Gunar J. Blumberg; Arthur G. Gilkes; William T. McClain

[57] ABSTRACT

A novel fire retardant block copolyester, poly(ethylene terephthalate/tetramethylene dibromoterephthalate), is prepared by reacting poly(ethylene terephthalate) and poly(tetramethylene dibromoterephthalate) to form the new block copolyester. Said copolyester finds commercial use as molding compounds for use in the construction, automobile, home appliances, and aircraft industries or as textile products for use as fibers or fabrics.

1 Claim, No Drawings

COPOLYESTER(ETHYLENE TEREPHTHALATE/TETRAMETHYLENE DIBROMOTEREPHTHALATE) A NEW BLOCK POLYMER

BACKGROUND OF INVENTION

With the recent growth in the use of synthetic materials in the textile, construction, automobile, household appliances and aircraft industries there has been increasing concern for the potential and real danger that results in the incidence of damage to property and of personal injury due to the high flammability of these synthetic materials. Concern for public safety has prompted several Government agencies to make inquiries and to propose and enact legislation to impose stricter flammability standards for these synthetic materials. In response to Government pressure the makers of synthetic materials are increasing their efforts to impart flame retardant properties to their products. Said manufacturers have in the past used additives containing phosphorous, nitrogen or halogen compounds, said compounds being physically admixed, baked on or affixed to the synthetic materials to impart fire retardancy. However, such additives tend to impart additional and often undesirable properties such as a decrease in strength, an increase in brittleness and/or an increase in weight of the synthetic materials. Further, it has been observed that these additives may wash off during home laundering in the case of textile synthetic and may be uncompatible in the case of synthetic materials used in molding applications.

Another method for imparting flame retardancy is to produce a synthetic material incorporating a flame retarding agent whereby the flame retarding agent is made an integral part of the chemical structure of the synthetic material. One example of this method is the use of dibromopentaerithritol incorporated into the chemical structure of a polyester to impart flame retardancy. However, such synthetic materials tend to be thermally unstable leading to undesirable color formation during preparation.

An object of this invention is to provide a novel flame retardant copolyester such that it is useful in the manufacture of textile articles or as use in molding applications in the manufacture of such items as home appliances, aircraft, or automobiles where a high degree of flame retardancy or a self-extinguishing property is desirable. Compositions of this compound can be utilized in those areas of application where fire is likely to occur or where the possibility of fire occurring presents a substantial danger or hazard to individuals or property. Examples of such applications are the interior of automobiles, aircraft, and buildings, home appliances, and textile products such as fabrics, clothes, carpets, draperies, and sleepwear.

Bromine levels sufficient to impart significant flame retardancy are introduced in the form of dimethyl-2,5-dibromoterephthalate. It has been found that the inclusion of bromine into a polyester material as an integral part of the molecular structure is a very effective method for achieving flame retardancy. Levels of bromine in the range of 30–45 weight percent derived from dimethyl-2,5-dibromoterephthalate make our novel copolyesters self-extinguishing. In addition, fire retardancy may be further enhanced by the addition of other fire retardant agents such as antimony oxide, to further improve flame retardancy performance.

Previous investigations have touched upon the use of halogenated terephthalic acids as components of saturated polyesters. However, the use of a halogenated terephthalic acid was for the purpose of improving dyeability of said polyesters. Such investigations reported the use of esterification catalysts such as $LiOCH_3$-magnesium or high esterification and polycondensation temperatures. The use of $LiOCH_3$-magnesium can be expected to decompose dimethyl bromoterephthalate or dimethyl dibromoterephthalate. It has also been observed that the application of high polyesterification or polycondensation temperatures, for example, in excess of 265°C. will promote the decomposition of polyesters containing monobromo or dibromoterephthalate components. Polyesters containing a brominated aromatic radical decompose rapidly and develop an undesirable dark color upon being heated to temperatures in excess of 265°C. The result is that the said saturated polyesters are less useful as a commercial product.

SUMMARY OF INVENTION

My novel block copolyester, poly(ethylene terephthalate/tetramethylene dibromoterephthalate), is prepared by reacting poly(ethylene terephthalate) with poly(tetramethylene dibromoterephthalate). Poly (tetramethylene dibromoterephthalate) in the amount of 5 to 30 weight percent is mixed in a reaction vessel with poly(ethylene terephthalate) in the amount of 95 to 70 weight percent. The mixture is then heated to a temperature in the range of 245° to 290°C. The mixture is maintained in this temperature range for a period of from 15 minutes to an hour while it is continually stirred. After such time said mixture is cooled and an opaque, crystalline, block copolyester of poly(tetramethylene dibromoterephthalate) and poly(ethylene terephthalate) is obtained. The poly (tetramethylene dibromoterephthalate is high melting, has a high crystallinity and rate of crystallization and contains 42% bromine. This invention takes advantage of those good properties in giving flame retardancy to poly(ethylene terephthalate)

The properties measured demonstrate the clear advantage of this type of polyester. It has three times the bromine at the same Tm and Tg as poly(ethylene terephthalate modified by dibromoterephthalic acid in such a manner to give a random, rather than a block copolyester structure.

The term intrinsic viscosity as used herein is calculated according to the following equations:

$$\eta_{intrinsic} = \frac{F}{W} \text{ where } F = \frac{(\eta r - 1 + 3 \ln \eta r)}{16}, W = \text{sample weight (gms)}$$

wherein $\eta r$ is calculated by dividing the flow time in a capillary viscometer of a dilute solution of polymer by the flow time for the pure solvent. The intrinsic viscosity was determined in 60/40 phenol/tetrachloroethane solvent at $0.1000 \pm 0.0030$ grams/25 cc concentration at 30.0°C. in a 1B Ubbelhode viscometer.

As used herein the polymeric melting point, Tm, is defined by a thermal analysis method and is defined as that point at which the polyester changes from a plastic consistency to molten liquid. The glass transition point, Tg, is defined as that temperature where the polyester changes from glassy to brittle, to leathery, flexible, plastic, but not flowing. The crystallization temperature, Tc, is defined as that temperature at which there is enough heat to allow mobility to the molecules so they may align themselves to form a crystalline structure.

EXAMPLE I

Chips of poly(tetramethylene dibromoterephthalate) 2.00 g., intrinsic viscosity was 0.22, and chips of poly(ethylene terephthalate) 8.00 gm, intrinsic viscosity was 0.67 were combined in a small polyesterification reactor. The oil bath temperature was raised to 285°C to melt the chips. The melt was stirred for 15 minutes by a nitrogen stream bubbling through the melt. The melt was cooled to give an opaque (crystalline) solid. For comparison, copoly(ethylene terephthalate/dibromoterephthalate) 80/20 was very difficult to crystallize. The intrinsic viscosity in 60/40 phenol/tetrachloroethane at 30.0°C. was 0.40. Bromine was measured at 9.85 percent, compared to the 8.44 percent calculated. Differential thermal analysis gave a Tm of 242°C. and a Tg of 70°C. The crystallinity was measured by X-ray diffraction to be 9 percent.

What I claim is:

1. The new composition of matter poly(ethylene terephthalate/tetramethylene dibromoterephthalate) consisting of a random structure of blocks of reoccurring structural units of 95 to 70 weight percent of poly(ethylene terephthalates) and 5 to 30 weight percent of poly(tetramethylene dibromoterephthalate).

* * * * *